(12) United States Patent
Stagg et al.

(10) Patent No.: US 9,826,485 B2
(45) Date of Patent: Nov. 21, 2017

(54) POWER SOURCE HOT SWAP MODE

(71) Applicant: SYMBOL TECHNOLOGIES, LLC, Lincolnshire, IL (US)

(72) Inventors: Adrian J. Stagg, Belfountain (CA); Steve Maddigan, Brampton (CA); Kevin Kar-Yin Chan, Woodbridge (CA); James Shoong-Leac Chen, Brampton (CA)

(73) Assignee: Symbol Technologies, LLC, Holtsville, NY (US)

( * ) Notice: Subject to any disclaimer, the term of this patent is extended or adjusted under 35 U.S.C. 154(b) by 104 days.

(21) Appl. No.: 14/947,395

(22) Filed: Nov. 20, 2015

(65) Prior Publication Data
US 2017/0150448 A1 May 25, 2017

(51) Int. Cl.
*H04W 52/02* (2009.01)

(52) U.S. Cl.
CPC ... *H04W 52/0261* (2013.01); *H04W 52/0296* (2013.01)

(58) Field of Classification Search
CPC ............. H04W 52/0261; H04W 52/0296
USPC .......................................... 455/574
See application file for complete search history.

(56) References Cited

U.S. PATENT DOCUMENTS

| | | | |
|---|---|---|---|
| 5,530,879 A * | 6/1996 | Crump ............... | G06F 1/3203 379/93.36 |
| 6,216,233 B1 * | 4/2001 | Baweja ............... | G06F 1/3203 365/222 |
| 6,601,181 B1 * | 7/2003 | Thomas ............... | G06F 1/30 713/340 |
| 2003/0169022 A1 * | 9/2003 | Turner ............... | G06F 1/30 320/166 |
| 2005/0044447 A1 * | 2/2005 | Dunstan ............... | G06F 1/3203 714/14 |
| 2005/0188149 A1 * | 8/2005 | Kaler ............... | G06F 11/1441 711/103 |
| 2007/0268200 A1 * | 11/2007 | Fuller ............... | G06F 3/14 345/1.1 |
| 2008/0070703 A1 * | 3/2008 | Campo ............... | G07F 17/3202 463/46 |
| 2010/0160855 A1 * | 6/2010 | Bernini ............... | A61M 5/14244 604/66 |
| 2010/0264738 A1 * | 10/2010 | Murtha ............... | G06F 1/263 307/66 |
| 2012/0216064 A1 * | 8/2012 | Ko ............... | G06F 1/3206 713/324 |
| 2012/0322431 A1 * | 12/2012 | Kil ............... | H02J 9/06 455/418 |

(Continued)

*Primary Examiner* — Qun Shen

(57) ABSTRACT

A method for power management of a mobile device includes detecting whether a removable power source has been removed from the mobile device. In response to detecting that the power source has been removed, entering a hot swap mode for a first time period by deactivating a first component of the mobile device and maintaining, via a backup power source in the mobile device, a powered state of a second component of the mobile device and an application state of the mobile device. The method further includes, after the first time period, entering a suspend mode for a second time period by deactivating the second component and continuing to maintain the application state of the mobile device for the second time period.

21 Claims, 4 Drawing Sheets

(56) References Cited

U.S. PATENT DOCUMENTS

| | | | |
|---|---|---|---|
| 2013/0059533 A1* | 3/2013 | Kwon | H04B 5/0037 |
| | | | 455/41.1 |
| 2013/0321851 A1* | 12/2013 | Miyata | H04N 1/00896 |
| | | | 358/1.14 |
| 2014/0240138 A1* | 8/2014 | Lee | H04M 1/7253 |
| | | | 340/636.1 |
| 2015/0181531 A1* | 6/2015 | Zajac | G06F 1/3212 |
| | | | 455/574 |
| 2015/0185815 A1* | 7/2015 | DeBates | G06F 1/3209 |
| | | | 713/320 |

* cited by examiner

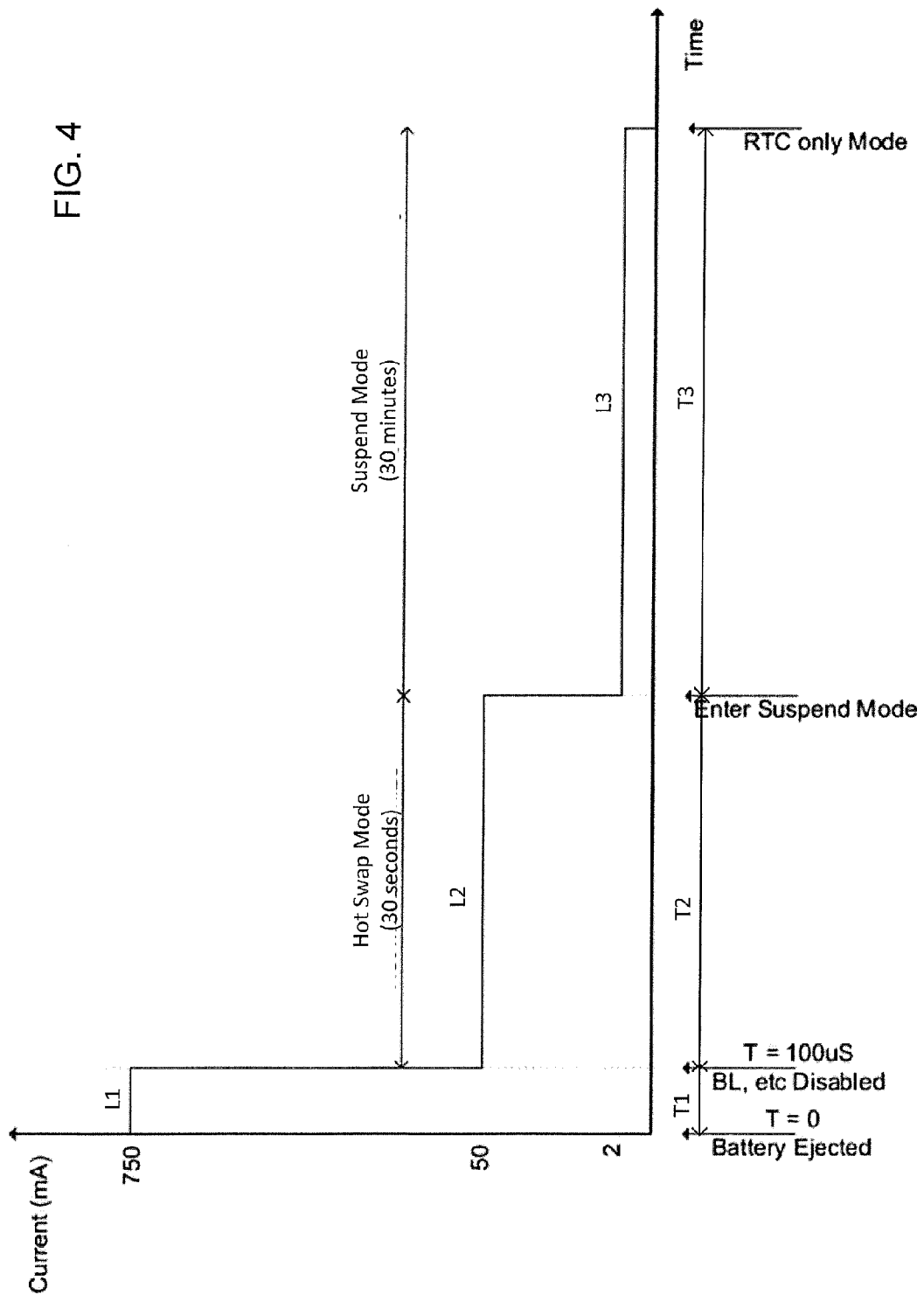

POWER SOURCE HOT SWAP MODE

BACKGROUND OF THE INVENTION

In the enterprise context, for instance in retail and warehouse environments, mobile devices are used for item scanning and form an integral part of inventory management and item checkout work flow. Therefore, continuous device availability throughout a work shift is needed for efficient operation. Mobile devices are typically powered by rechargeable batteries, which may be removed from the device for separate charging. Removable batteries permit the user to replace a dead battery with one that is fully charged in order to continue using the mobile device for the remainder of a work shift. However, removing the battery results in a loss of power and of the application data that was being entered into the device. This prevents the user from maintaining an application session that was initiated prior to removal of the battery.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 is a schematic illustrating a current profile of a backup power source of the mobile computing device of FIG. 1, in accordance with some embodiments.

Figure 1:
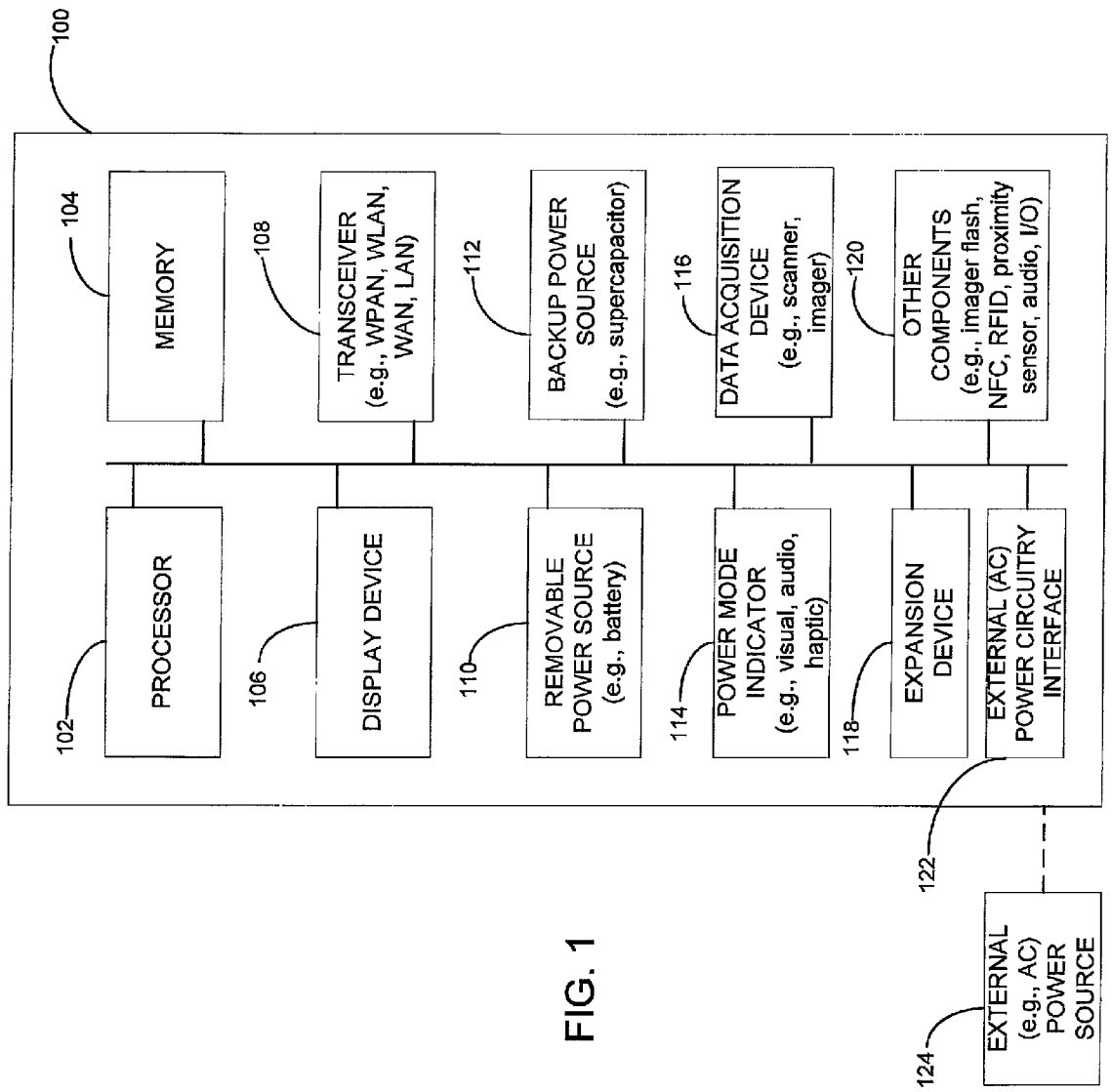
FIG. 1 is a block diagram illustrating an embodiment of a mobile computing device configured to implement a battery hot swap mode, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In one embodiment, a method for power management of a mobile device includes detecting whether a removable power source has been removed from the mobile device. In response to detecting that the power source has been removed, the method includes entering a hot swap mode for a first time period by deactivating a first component of the mobile device and maintaining, via a backup power source in the mobile device, a powered state of a second component of the mobile device and an application state of the mobile device. The method further includes, after the first time period, entering a suspend mode for a second time period by deactivating the second component and continuing to maintain the application state of the mobile device for the second time period. It should be noted that, in other embodiments, the method includes providing more than two modes of operation with varying degrees of device functionality being powered by the backup power source when the removable power source is removed.

An embodiment of the first time period corresponds to a time period needed for a power state of the backup power source to decline to a predetermined level, while an embodiment of the second time period corresponds to a time period needed for a power state of the backup power source to be exhausted after declining to a predetermined level. Embodiments of the disclosed method include maintaining a communication session connection status for the second component during the hot swap mode, which may be done while one of limiting and eliminating transmission and reception of data. In one of the disclosed embodiments, at least one of the first component and second component is reactivated when the removable power source has been re-connected. In additional embodiments, an indicator of at least one of the hot swap mode and the suspend mode is provided. Embodiments of the indicator are selected from the group consisting of a visual indicator, an audio indicator, and a haptic feedback indicator. An embodiment of the indicator includes a rate of indication that varies in proportion to a time remaining for the mobile device to remain in at least one of the hot swap mode and the suspend mode. In one example, the rate of indication is inversely proportional to the time remaining for at least one of the hot swap mode and the suspend mode. In one embodiment, the mobile device detects that a battery has been removed while the mobile device was disconnected from an external power source. An embodiment of the backup power source includes a capacitor. An embodiment of the mobile device includes a component configured to capture barcode data.

Examples of the first component include one or more of a display, an imaging component, a scanning component, a camera flash, an expansion component, a near field communication (NFC) component, a radio frequency identification (RFID) component, a proximity sensor, and an audio component. Examples of the second component include one or more of a Wireless Personal Area Network (WPAN) component, a Wireless Local Area Network (WLAN) component, and a Wireless Wide Area Network (WWAN) component, as well as a processor, such as a Central Processing Unit (CPU).

In additional embodiments, the application state of the mobile device is maintained by at least one of maintaining a powered state and updating of a memory of the mobile device, where the memory of the mobile device is one or more of a temporary memory and a permanent memory.

In yet another embodiment, a mobile device is disclosed. The mobile device includes a processor and a removable power source disposed in the mobile device and configured to supply power to the mobile device. The mobile device further includes a backup power source disposed in the mobile device and configured to supply the power to the mobile device when the removable power source has been removed from the mobile device, as well as a plurality of components, including a first component and a second component. The memory of the mobile device stores instructions that, when executed by the processor, configure the mobile device to detect whether the removable power source has been removed from the mobile device and, in response to detecting that the removable power source has been removed, enter a hot swap mode for a first time period by deactivating the first component and maintaining, via the backup power source, a powered state of the second component and an application state in the memory of the mobile device. After the first time period, the instructions include entering a suspend mode for a second time period by deactivating the second component and continuing to maintain the application state in the memory for the second time period.

In a further embodiment, a tangible computer readable medium having stored thereon computer executable instructions is disclosed. The instructions include detecting whether a removable power source has been removed from the mobile device and, in response to detecting that the power source has been removed, entering a hot swap mode for a first time period by deactivating a first component of the mobile device and maintaining, via a backup power source in the mobile device, a powered state of a second component of the mobile device and an application state of the mobile device. The instructions further include, after the first time period, entering a suspend mode for a second time period by deactivating the second component and continuing to maintain the application state of the mobile device for the second time period.

FIG. 1 is a block diagram illustrating an embodiment of a mobile device (MU) 100 having a processor 102 configured to implement a battery hot swap mode in accordance with an embodiment of the present disclosure. In the illustrated embodiment, the MU 100 is a portable device such as a mobile phone, a personal digital assistant, a smartphone, a tablet, a laptop, a portable barcode reader, or the like. In an embodiment, the MU 100 includes a processor 102, a memory arrangement 104, a display device 106, and a communications transceiver 108. The MU 100 further includes a removable power source 110, a backup power source 112, a power mode indicator 114, a data acquisition device 116, an expansion device 118, and a plurality of other components 120. As shown in FIG. 1, the MU 100 further includes power circuitry 122 for connecting to an external power source, such as an alternating current (AC) power source 124.

The processor 102 executes a plurality of applications of the MU 100, including a web browser that connects to a communication network via the transceiver 108. The memory 104 stores data related to applications and operations executed by the processor 102 and includes both permanent and temporary memory, such as RAM, ROM, flash memory, and/or a hard drive. Additionally, as will be described in further detail below, the processor 102 detects whether a removable power source 110, such as a battery, has been removed from the MU 100 and, if the external power source 124 is not connected, enters a hot swap mode that provides time for the user to swap a freshly recharged battery while the MU 100 maintains its application state and continues powering a subset of components via an internal backup power source 112. In one embodiment, the backup power source 112 is a supercapacitor that is configured to power the memory 104 and/or a subset of components of the MU 100 for a time period generally determined by a discharge rate of the backup power source 112. In an embodiment, during the hot swap mode, power-intensive non-critical components, such as display device 106, are deactivated while the backup power source 112 powers the memory 104, which includes the application data, and the transceiver 108 in order to maintain the application state and any existing communication session connections established prior to removal of the battery 110. Optionally, the memory 104 may be updated with new application data received via a communication session during the hot swap mode. Advantageously, the hot swap mode allows the user to continue his or her workflow established prior to removal of the battery 110 without the loss of network connections and application data when the battery is reinserted while the MU 100 is in the hot swap mode. In one embodiment, when the backup power source 112 discharges to a predetermined level (alternatively when a pre-set hot swap timer expires), the processor 102 causes the MU 100 to enter a suspend mode where the transceiver 108 is deactivated to further save the remaining charge of the backup power source 112 that is used to continue to power the memory 104. Alternatively, the MU 100 reduces the data throughput of the transceiver 108 during the suspend mode to a minimum needed to maintain existing connection status. Those of skill in the art will realize that although the hot swap and suspend mode operations may be controlled by a processor 102, other embodiments include powering down the processor 102 during the hot swap and/or suspend modes and controlling these modes via a separate internal low-power controller to further minimize the power consumption and extend the hot swap and/or suspend mode durations.

In the illustrated embodiment, the MU 100 includes a power mode indicator 114 which provides a user with an indication of the operating mode. In various embodiments, the indicator 114 may be a visual indicator, such as a light emitting diode (LED), an audio indicator, such as an audio tone, a haptic feedback or force indicator, such as a vibrating indicator, or a combination of one or more different indicator types. Preferably, the power mode indicator 114 provides a user-perceivable indication signal that varies in proportion to the time that the MU 100 will remain in the hot swap and/or suspend modes. When the power mode indicator 114 is an LED, the rate of flash varies according to the time remaining in the hot swap mode in order for the user to timely change the battery before the MU 100 enters the suspend mode and powers down additional components. For instance, the flash rate of the LED increases as the time remaining in the hot swap mode decreases in order to provide an increasing sense of urgency for the user to timely swap the battery. In an embodiment, when the device enters the suspend mode, the LED flash rate may slow down to that below the slowest rate used in the hot swap mode in order to further save power. In another embodiment, the flashing of the LED during the suspend mode varies in a similar manner to that in the hot swap mode but at correspondingly slower rates in order to further conserve remaining charge of the backup power source 112. Alternatively, the LED may stay continuously lit in either the hot swap or the suspend modes. In a further embodiment, the LED is turned off once the MU 100 enters the suspend mode in order to conserve remaining charge of the backup power source 112. When the backup power source 112 is fully drained, the MU 100 enters an OFF state any components of the MU 100 that were powered during the hot swap mode are turned off. Those of skill in the art will realize that the foregoing power mode indications may be implemented via other indicators, including those discussed above. Additionally, the hot swap mode and the suspend mode may be indicated via different respective indicators to further delineate each mode for the user and to tailor the available power requirements in each mode to the power consumption requirements of corresponding indicator types. For instance, one or more of the haptic, audio and visual indicators may be used during the hot swap mode, while the suspend mode may be limited to the visual (e.g., LED) indicator.

The transceiver 108 is configured to transmit and/or receive data via a plurality of networks, including a wireless personal area network (WPAN), such as a Bluetooth network, a wireless local area network (WLAN), such as a WiFi network, a local area network (LAN), such as an Ethernet based network, or a wide area network (WAN), including a wired wide area network and a wireless wide area network (WWAN), such as a cellular network.

The display device 106 may be any component configured to show data to a user. The display device 106 may be, for example, a liquid crystal display (LCD) to conform to the size of the electronic device 100. The data acquisition device 116 includes a scanner, such as a laser based scanner, and/or an imager, such as a camera, configured to capture and decode barcode data. The MU 100 includes an expansion slot and/or an input/output (I/O) port configured to accept an expansion device 118, such as a memory card or another expansion component. As further shown in FIG. 1, the MU 100 includes a plurality of other components 120, including an optical flash component for the imager 116, a near field communication (NFC) reader, a radio frequency identification (RFID) reader a proximity sensor, audio circuitry for reproducing audio signals, as well as a plurality of I/O devices. In various embodiments, an I/O device may be any component configured to receive an input from the user. For example, an I/O device may be a keypad (e.g., an alphanumeric keypad, a numeric keypad or the like). The I/O device may also be a touch sensing pad for a user to enter inputs manually with a finger(s) or a stylus. It should be noted that the display device 106 may also incorporate an I/O device, particularly when the I/O device is a touch sensing pad including an area in which the user may enter inputs. In another example, the I/O device may be a transparent touch sensor placed on top of the display 106 that enables a user to enter inputs.

Figure 2:
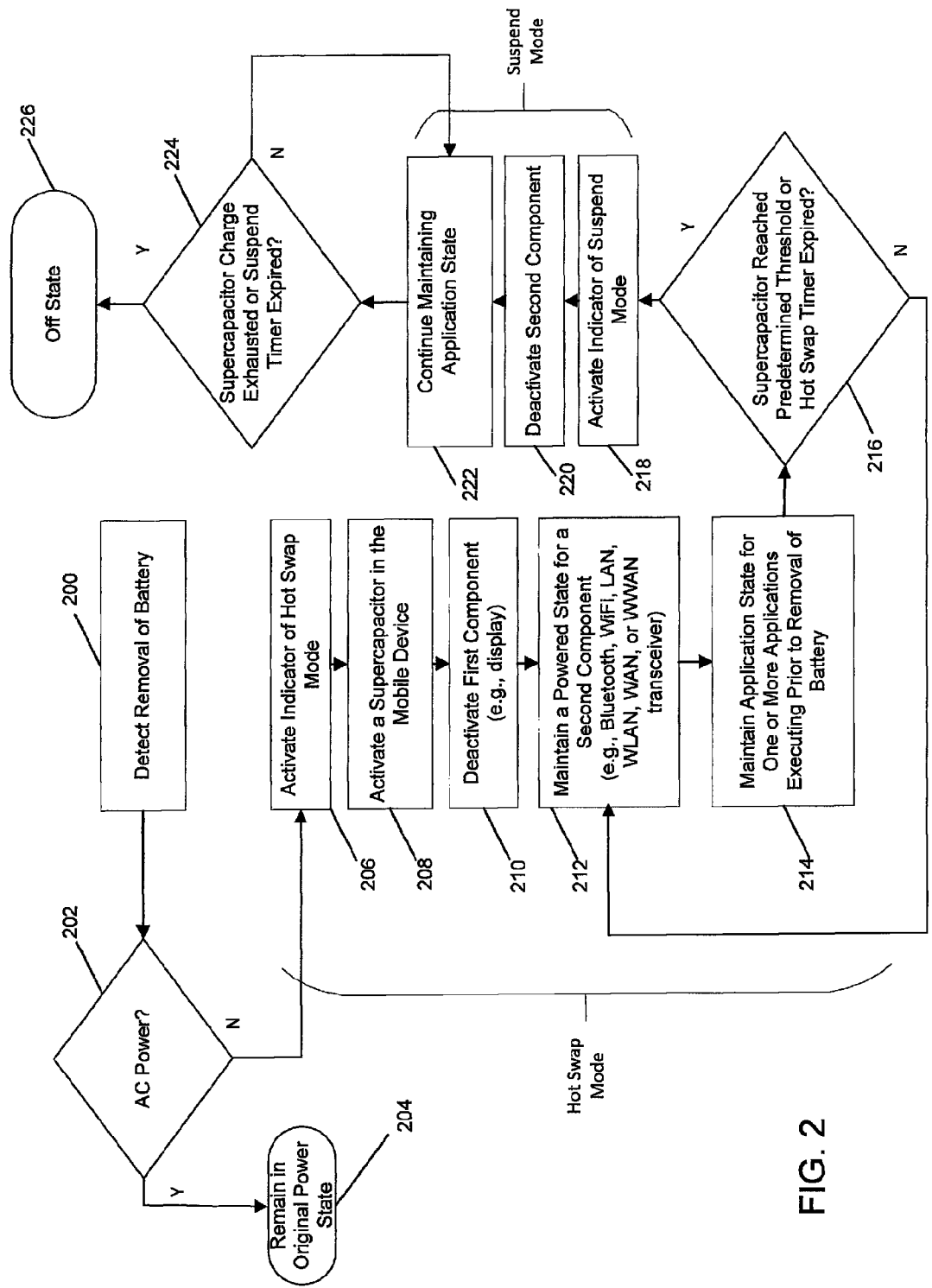
FIG. 2 is a flowchart of a method for power management of a mobile computing device of FIG. 1, in accordance with some embodiments.

Referring to FIG. 2, an embodiment of a method for power management of a computing device 100 is shown. In step 200, the MU 100 detects removal of the battery. If, in step 202, the battery was removed when the MU 100 was connected to the external power source 124 (e.g., connected AC power), then the MU 100 remains in the same power state in which it was prior to removal of the battery, step 204. Otherwise, the MU 100 activates an indicator to let the user know that it has entered a hot swap mode for the use to replace the battery and activates the backup power source 112 (e.g., a supercapacitor, a backup rechargeable battery) for powering a predetermined subset of components, steps 206-208. In an embodiment, the hot swap indicator is an LED indicator having a relatively slow flashing rate close in time to when the battery was just removed. As the remaining charge of the backup power source 112 is decreasing (alternatively or in addition, as a predetermined hot swap mode timer approaches expiration), the LED indicator's flash rate increases to indicate to the user that the MU 100 is approaching the suspend mode during which additional components will be disconnected. In one embodiment, just prior to the MU 100 transitioning to the suspend mode, the LED indicator turns solid prior to turning off in the suspend mode so as to further indicate to the user that the device is no longer in the hot swap mode. In an alternate embodiment, the LED indicator 114 remains solid throughout the hot swap mode and turns off when the device enters the suspend mode.

In steps 210-214, while the MU 100 is in the hot swap mode, the MU 100 deactivates one or more power-intensive components, such as the display 106, while the backup power source 112 powers a subset of other components of the MU 100, such as the transceiver 108 and memory 104 in order to provide session persistence when the battery has been removed. This provides the user with time to change the battery while the MU 100 maintains session persistence. In particular, since the backup power source continues to power and/or update the memory 104, the MU 100 maintains the application data (e.g., form data in a browser or other application data in the memory) and application state for applications executing prior to removal of battery. Similarly, any communication sessions associated with the applications executing prior to removal of battery are maintained via the transceiver 108. In step 216, the MU 100 continues to maintain session persistence by maintaining the powered state of components that maintain the communication session and maintaining application state until the charge of backup power source 112 decreases to a predetermined threshold. Alternatively or in addition, the MU 100 remains in the hot swap mode until a predetermined hot swap timer expires. In an embodiment, MU 100 remains in the hot swap mode for approximately 30 seconds to allow the user to swap the battery. Preferably, if the user replaces the battery (or reconnects external power source 124) while the MU 100 is in the hot swap mode, the application session resumes automatically from the point when the battery was removed without the need to re-connect the communication session.

If the supercapacitor is discharged to a predetermined threshold and/or when a hot swap timer expires (e.g., 30 seconds or any time period during which the backup powers source is discharged to a predetermined remaining charge level), the MU 100 enters the suspend mode and activates an optional suspend mode indicator, as discussed above, step 218. In steps 220-222, the MU 100 deactivates one or more additional components, such as the transceiver 108, while continuing to maintain the application state and associated application data by powering the application memory via the backup power source 112. In step 224, the MU 100 continues to maintain the application state in the suspend mode until the remaining charge of the supercapacitor (backup power source 112) has been exhausted. Alternatively, the MU 100 continues to maintain the application state until the expiration of a suspend timer which may be set to expire before the supercapacitor charge is completely exhausted. In one embodiment, the MU 100 operates in the suspend mode for approximately 30 minutes. If the user replaces the battery (or reconnects external power source 124) while the MU 100 is in the suspend mode, application state (e.g., including current screen or mode) and application data (e.g., form data entered into in a browser or other application) will be recovered. In step 226, when the supercapacitor charge is exhausted or the suspend timer expired, the MU 100 enters the OFF state by powering down remaining components. In an embodiment, when the user inserts the battery or reconnects the external power source after the MU 100 enters the OFF state in step 226, the MU 100 reboots at activation, in which case the processing may return to step 200.

In an additional embodiment, when the MU 100 is in the hot swap mode and just before hot swap mode or hot swap timer expiry, for example, the MU 100 sends out a system-wide notification, such as a "shutting-down" type notification or a "low-memory" type notification. This notification is used to persist user-data from RAM to flash memory in anticipation of the application(s) being subject to an impending shut-down event. If a battery is inserted (or external power source reconnected) before the MU 100 enters into the OFF state (in step 226), then the user-session and running applications resume as normal. If the battery is inserted (or external power source reconnected) after the MU 100 enters the OFF state, the MU 100 reboots, and all previously-running applications are be able to access the previously saved user-data from flash memory, thereby preventing data loss caused by battery removal.

In a further embodiment, when the MU 100 is in the hot swap mode, the MU 100 stores a list of currently-running applications to flash memory, as well as a hot swap timestamp (e.g., upon entry into the hot swap mode in step 206). If the battery is reinserted (or external power source reconnected) before the MU 100 enters the OFF state of step 226, the running applications list is discarded. If the battery is inserted (or external power source reconnected) after the MU 100 enters the OFF state of step 226, the MU 100 reboots. In this case, the MU 100 compares the current timestamp with the hot swap timestamp to determine whether it is still likely to be used by the same user and, consequently, whether to restart the applications from the list of applications running when the device entered the hot swap mode. For example, if the time difference is less than a predetermined threshold (for example, less than 10 minutes with the suspend timer being set to expire before such threshold)—it is assumed that the user has not changed and the MU 100 automatically restarts the list of applications. This reloads all persisted user data from flash memory, as discussed above. Therefore, from the user's perspective, their user session is restored after the reboot. If, on the other hand, the time difference exceeds the predetermined threshold, it is assumed that the MU 100 is now with a different user, and the list of running applications is discarded.

In yet further embodiments, the hot swap and/or suspend modes include multiple sub-states based on remaining charge level of the backup power source 112 where different sets of components of the MU 100 are kept powered and operational as the MU 100 transitions from hot swap to suspend mode. In one embodiment, while in the hot swap mode, the MU 100 deactivates the display while maintaining the network connection via powering the transceiver and maintaining the application state via updating and powering the memory (e.g., based on data from the ongoing communication session). In such an embodiment, the MU 100 activates a wakelock setting that prevents a timer, such as an inactivity timer, from deactivating the communication session and/or prematurely forcing the MU 100 into the suspend mode. The wakelock setting may be active until the backup power source 112 discharges to a predetermined threshold, at which point the MU 100 enters the suspend mode. While in the suspend mode, the MU 100 may deactivate groups of components in stages in accordance with the rate of discharge of the backup power source 112. For instance, in the first suspend sub-state of the suspend mode, the MU 100 additionally deactivates input devices, such as the touch screen, as well as turns off the frame buffer and freezes device and application processes, while keeping the memory 104 in a powered state. Then, in the second suspend sub-state of the suspend mode, as the remaining charge of the backup power source 112 nears exhaustion, the MU 100 turns off all other components and removes power from the memory 104 while continuing to provide a small amount of power to the internal real-time clock (RTC) and to device crystals/oscillators (XTAL) that provide reference for the phase locked loops in order to continue keeping system time until the backup power source 112 is exhausted. This speeds up device startup when power is restored. When the main battery 110 is re-installed, the MU 100 checks the battery charge state and allows transition to an active device mode if the battery voltage is above a predetermined minimum threshold.

In addition to automatic initiation of the hot swap and suspend modes as described above, in a further embodiment, the user initiates the hot swap and/or suspend operation manually, such as via a menu selection and/or via a power key. In such an embodiment, the hot swap and/or suspend modes are initiated with or without power from the battery power source 110 or external power source 124.

Figure 3:
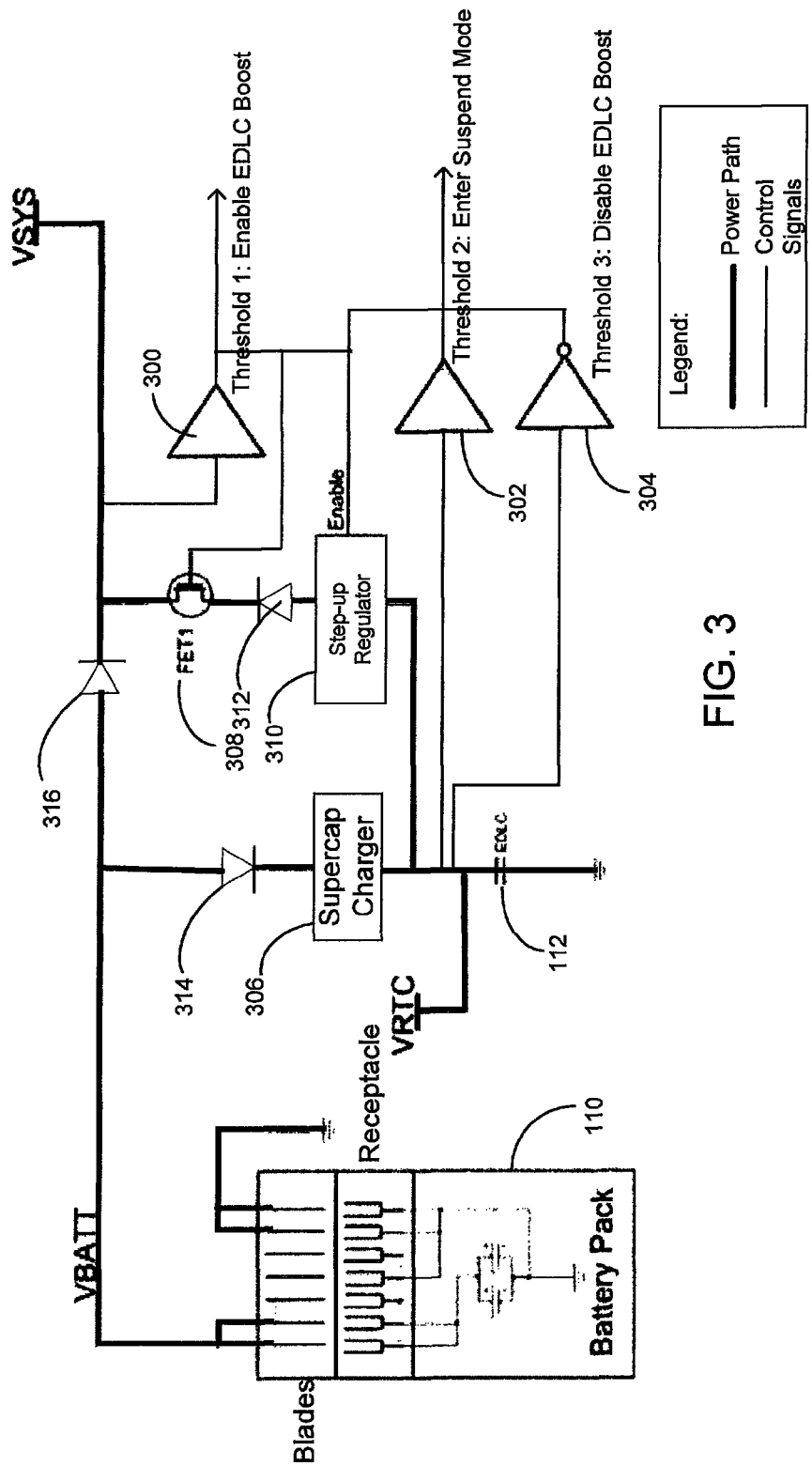
FIG. 3 is a schematic of a circuit architecture for power management of a mobile computing device of FIG. 1, in accordance with some embodiments.

Turning to FIG. 3, an embodiment of a circuit architecture for power management of a mobile computing device 100 is shown. In the circuit of FIG. 3, when battery 110 is ejected from the device, comparator 300 detects falling main system voltage of VSYS, and initiates the hot swap mode by enabling regulator boost via the backup power source 112, such as the electric double-layer capacitor (EDLC), at voltage Threshold 1. In the illustrated embodiment, VSYS is the main system voltage rail from which all other voltage rails are derived. The signal from comparator 300 is also used to disable high current components, such as display backlight, camera flash, and imager illumination. The MU 100 runs from the EDLC supercapacitor 112 in the hot swap mode until comparator 302 detects that a lower voltage Threshold 2 has been reached, and toggles an On/Off key, causing the MU 100 to enter the suspend mode of operation. When comparator 304 detects that a further lower voltage Threshold 3 is reached, it disables EDLC 112 allowing VSYS to collapse, to preserve reserve capacity in EDLC 112 to run the real-time clock VRTC. When battery 110 is re-inserted, comparator 300 detects VSYS voltage rising above Threshold 1, and disables EDLC 112 regulator boost, if it was in the enabled state. EDLC supercapacitor 112 is charged via the supercap charger 306 from VBATT when battery 110 is present. In the illustrated embodiment, the field effect transistor (FET) 308 may be employed if start up time of EDLC step-up regulator 310 is too long. In this case, the step-up will always be enabled, and FET 308 will be used to connect the EDLC step up regulator 310 to VSYS with minimum delay. Diodes 312, 314, 316 ensure proper current flow direction from the battery 110 and step-up regulator 310.

Referring to FIG. 4, an embodiment of a current profile of the backup power source 112 during the hot swap and suspend modes of operation of the MU 100 is shown. As illustrated in FIG. 4, when the battery 110 is ejected at time T=0, the backup power source's current output very briefly stays near constant level L1 (e.g., 750 mA) for a period T1 at the end of which the backlight of the MU 100 is disabled. In the illustrated embodiment, the time period T1 is in the order of microseconds, for example approximately 100 microseconds. The MU 100 enters the hot swap mode of operation, described above, at the end of time period T1 for the duration of a time period T2, during which the current output of the backup power source 112 drops to a lower level of L2 (e.g., 50 mA). In an embodiment, the time period T2 is several tens of seconds or more, such as approximately 30 seconds, in order to allow the user a reasonable amount of time to quickly swap a freshly charged battery while the session is being persisted by the MU 100. At the end of time period T2, the MU 100 enters the suspend mode of operation, as described above, during which the current output of the backup power source 112 drops further to the level L3 (e.g., 2 mA). The suspend mode of operation lasts for the time period T3. In the illustrated embodiment, the time period T3 is on the order of several tens of minutes or more, such as 30 minutes. At the end of the suspend mode, when all other components have been disabled, any remaining charge in the backup power source is used to continue to power the real-time clock and/or device crystals, which require very little power to continue preserving system time.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As used herein, each of the terms "computer-readable medium," "computer-readable storage medium," "tangible computer-readable medium," "non-transitory computer-readable medium," "tangible machine-readable medium," "non-transitory machine-readable medium," and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "computer-readable medium," "computer-readable storage medium," "tangible computer-readable medium," "non-transitory computer-readable medium," "tangible machine-readable medium," "non-transitory machine-readable medium," and "machine-readable storage device" is expressly defined to exclude propagating signals. That is, as used in any claim of this patent, none of the terms "computer-readable medium," "computer-readable storage medium," "tangible computer-readable medium," "non-transitory computer-readable medium," "tangible machine-readable medium," "non-transitory machine-readable medium," and "machine-readable storage device" can be read to be implemented by a propagating signal. Further, as used herein, each of the terms "computer-readable medium," "computer-readable storage medium," "tangible computer-readable medium," "non-transitory computer-readable medium," "tangible machine-readable medium," "non-transitory machine-readable medium," and "machine-readable storage device" is expressly defined as a storage medium on which machine-readable instructions are stored for any suitable duration of time (e.g., permanently), an extended period of time (e.g., while a program associated with the machine-readable instructions is executing), and/or a short period of time (e.g., while the machine-readable instructions are cached and/or during a buffering process).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for power management of a mobile device comprising:
   detecting whether a removable power source has been removed from the mobile device;
   in response to detecting that the power source has been removed, entering a hot swap mode for a first time period by:
      deactivating a first component of the mobile device, and
      maintaining, via a backup power source in the mobile device, a powered state of a second component of the mobile device and an application state of the mobile device;
   initiating a hot swap timestamp in connection with entering the hot swap mode;
   saving to non-volatile memory a list of one or more applications executing on the mobile device when the hot swap timestamp is initiated;
   after the first time period, entering a suspend mode for a second time period by:
      deactivating the second component, and
      continuing to maintain the application state of the mobile device for the second time period;
   determining whether the mobile device is likely to be used by a same user when the removable power source has been re-connected by comparing a current timestamp with the hot swap timestamp; and
   restarting the one or more applications on the list when it is determined that the mobile device is likely to be used by the same user.

2. The method of claim 1 wherein the first time period corresponds to a time period needed for a power state of the backup power source to decline to a predetermined level.

3. The method of claim 1 wherein the second time period corresponds to a time period needed for a power state of the backup power source to be exhausted after declining to a predetermined level.

4. The method of claim 1 further comprising maintaining a communication session connection status for the second component during the hot swap mode.

5. The method of claim 4 further comprising maintaining the communication session connection status for the second component during the hot swap mode while limiting or eliminating transmission and reception of data.

6. The method of claim 1 further comprising re-activating at least one of the first component and the second component when the removable power source has been re-connected.

7. The method of claim 1 further comprising providing an indicator of at least one of the hot swap mode and the suspend mode.

8. The method of claim 7 wherein the indicator is selected from the group consisting of a visual indicator, an audio indicator, and a haptic feedback indicator.

9. The method of claim 8 wherein the indicator includes a rate of indication that varies in proportion to a time remaining for the mobile device to remain in at least one of the hot swap mode and the suspend mode.

10. The method of claim 9 wherein the rate of indication is inversely proportional to the time remaining for at least one of the hot swap mode and the suspend mode.

11. The method of claim 1 wherein the detecting step further includes detecting that a battery has been removed from the mobile device while the mobile device was disconnected from an external power source.

12. The method of claim 1 wherein the backup power source is a capacitor.

13. The method of claim 1 wherein the mobile device includes a component configured to capture barcode data.

14. The method of claim 1 wherein the first component includes one or more of a display, an imaging component, a scanning component, a camera flash, an expansion component, a near field communication (NFC) component, a radio frequency identification (RFID) component, a proximity sensor, and an audio component.

15. The method of claim 1 wherein the second component includes one or more of a Wireless Personal Area Network (WPAN) component, a Wireless Local Area Network (WLAN) component, a Wireless Wide Area Network (WWAN) component, and a processor.

16. The method of claim 1 wherein the application state of the mobile device is maintained by at least one of maintaining a powered state and updating of a memory of the mobile device.

17. The method of claim 16 wherein the memory is one or more of a temporary memory and a permanent memory of the mobile device.

18. A mobile device comprising:
   a processor;
   a removable power source disposed in the mobile device and configured to supply power to the mobile device;
   a backup power source disposed in the mobile device and configured to supply the power to the mobile device when the removable power source has been removed from the mobile device;
   a plurality of components, including a first component and a second component; and
   a memory storing instructions that, when executed by the processor, configure the mobile device to:
      detect whether the removable power source has been removed from the mobile device;
      in response to detecting that the removable power source has been removed, enter a hot swap mode for a first time period by deactivating the first component and maintaining, via the backup power source, a powered state of the second component and an application state in the memory of the mobile device;
      initiate a hot swap timestamp in connection with entering the hot swap mode:
      save to the memory a list of one or more applications executing on the mobile device when the hot swap timestamp is initiated;
      after the first time period, enter a suspend mode for a second time period by deactivating the second component and continuing to maintain the application state in the memory for the second time period;
      determine whether the mobile device is likely to be used by a same user when the removable power source has been re-connected by comparing a current timestamp with the hot swap timestamp; and
      restart the one or more applications on the list when it is determined that the mobile device is likely to be used by the same user.

19. The mobile device of claim 18 wherein:
   the first time period corresponds to a time period needed for a power state of the backup power source to decline to a predetermined level; and the second time period corresponds to a time period needed for the power state of the backup power source to be exhausted after declining to the predetermined level.

20. The mobile device of claim 18 wherein the mobile device maintains a communication session connection status for the second component during the hot swap mode.

21. A tangible computer readable medium having stored thereon computer executable instructions, the instructions comprising:
  detecting whether a removable power source has been removed from the mobile device;
  in response to detecting that the power source has been removed, entering a hot swap mode for a first time period by:
    deactivating a first component of the mobile device, and
    maintaining, via a backup power source in the mobile device, a powered state of a second component of the mobile device and an application state of the mobile device;
  initiating a hot swap timestamp in connection with entering the hot swap mode;
  saving to non-volatile memory a list of one or more applications executing on the mobile device when the hot swap timestamp is initiated;
  after the first time period, entering a suspend mode for a second time period by:
    deactivating the second component, and
    continuing to maintain the application state of the mobile device for the second time period;
  determining whether the mobile device is likely to be used by a same user when the removable power source has been re-connected by comparing a current timestamp with the hot swap timestamp; and
  restarting the one or more applications on the list when it is determined that the mobile device is likely to be used by the same user.

* * * * *